Figures 1, 2:
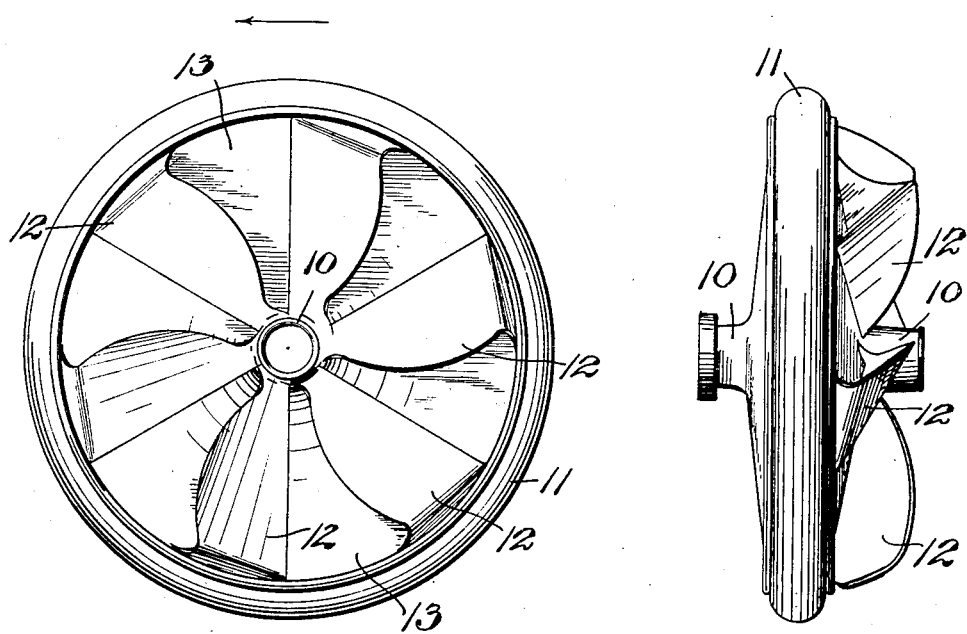

Oct. 27, 1931.　　　　W. BROWN　　　　1,829,500

LANDING WHEEL

Original Filed Aug. 2, 1929

INVENTOR
William Brown,
BY
Wm H Caufield
ATTORNEY

Patented Oct. 27, 1931

1,829,500

UNITED STATES PATENT OFFICE

WILLIAM BROWN, OF IRVINGTON, NEW JERSEY

LANDING WHEEL

Application filed August 2, 1929, Serial No. 383,052. Renewed August 13, 1931.

This invention relates to an improved landing wheel for airplanes. The wheel is constructed in a manner to cause it to be rotated forwardly by the air pressure when the airplane is in flight.

The object of the invention is to lessen the chance of tilting and overturning in landing a plane; to prolong the life of the tire of the wheel for the reason that it is rotating when it engages the ground; and to lessen the resistance to the air of the landing gear when the plane is flying.

Many various forms can be made to bring about the advantages of such construction as above outlined but a preferred form of wheel is illustrated in the accompanying drawings, in which Figure 1 is a side view of a wheel embodying my invention and Figure 2 is a front view of the wheel shown in Figure 1.

The wheels are used in pairs under the fuselage of a plane and no illustration of this well known part of an airplane is part of the drawings. The wheel comprises a body portion including a hub 10 which receives an axle. The wheel has a tire 11 which is usually of rubber and in the stationary form of wheel is soon worn out because the shock of impact tears the rubber. Furthermore, it sometimes happens that the impact of the wheel on the ground is sharp and the plane turns over on its nose. If the wheel is revolving when it contacts there is less liability of this form of accident.

To propel the wheel while the plane is flying the wheel is provided with blades 12 which are arranged to cause the rotation of the wheel. The preferred form is to incline these blades to catch the air at the lower part of the wheel and deflect it at the upper part. It is usual to form the blades of sheet metal and incline them outwardly relative to the wheel surface and at an angle to the axis of the wheel.

Less chance of spilling the wind out of the blades is provided by making the wheel of the disc type as the disc 13 forms a series of pockets with the blades 12. The disc 13 is cone-shaped and the blades 12 extend from the hub to the rim. They thus utilize nearly the whole diameter of the wheel for revolving the wheel and the wheel revolves nearly at the speed at which the plane is moving relative to the ground. The drawings fully illustrate this and the wheel will revolve counter-clockwise in Figure 1, assuming the arrow as indicating the direction of flight.

The wheel when rotated in flight of the plane can be utilized for propelling any accessory or experimental apparatus on the plane and thereby economize by dispensing with any additional positively driven motor on the plane.

I claim:

A landing wheel for airplanes having a disc body with a rim and a hub and with the disc inclined to the hub to provide a cone-shaped surface, and blades projecting laterally from the disc and extending from the rim to the hub and thus co-operating with the face of the disc to form pockets utilizing the whole face of the disc.

In testimony whereof I affix my signature.
WILLIAM BROWN.